US012585816B2

(12) United States Patent
Fishkov et al.

(10) Patent No.: US 12,585,816 B2
(45) Date of Patent: Mar. 24, 2026

(54) SYSTEMS AND METHODS FOR SELECTIVE ENCRYPTION OF SENSITIVE IMAGE DATA

(71) Applicant: RingCentral, Inc., Belmont, CA (US)

(72) Inventors: Daniel Fishkov, San Jose, CA (US); Lev Rosenblit, Shoham (IL)

(73) Assignee: RingCentral, Inc., Belmont, CA (US)

( * ) Notice: Subject to any disclaimer, the term of this patent is extended or adjusted under 35 U.S.C. 154(b) by 167 days.

(21) Appl. No.: 18/190,621

(22) Filed: Mar. 27, 2023

(65) Prior Publication Data

US 2024/0330501 A1    Oct. 3, 2024

(51) Int. Cl.
| | |
|---|---|
| *G06F 21/62* | (2013.01) |
| *G06T 7/20* | (2017.01) |
| *G06T 9/00* | (2006.01) |
| *G06V 10/25* | (2022.01) |
| *G06V 10/74* | (2022.01) |
| *G06V 40/16* | (2022.01) |

(52) U.S. Cl.
CPC ............ *G06F 21/6245* (2013.01); *G06T 7/20* (2013.01); *G06T 9/00* (2013.01); *G06V 10/25* (2022.01); *G06V 10/761* (2022.01); *G06V 40/171* (2022.01); *G06T 2207/30201* (2013.01)

(58) Field of Classification Search
CPC .. G06F 21/6245; G06V 10/25; G06V 40/171; G06V 10/761; G06V 40/16; G06T 7/20; G06T 9/00; G06T 2207/30201; H04L 63/0428
See application file for complete search history.

(56) References Cited

U.S. PATENT DOCUMENTS

| | | | |
|---|---|---|---|
| 7,151,831 | B2 | 12/2006 | Candelore et al. |
| 7,861,096 | B2 | 12/2010 | Staddon et al. |
| 10,297,126 | B2 * | 5/2019 | Rao ........................ H04N 19/17 |

(Continued)

FOREIGN PATENT DOCUMENTS

WO    WO2009038830 A2    3/2009

OTHER PUBLICATIONS

Laimoon et al., Light Weight Encryption for Medical Images, 2016, ICCTA (Year: 2016).*

(Continued)

*Primary Examiner* — Philip J Chea
*Assistant Examiner* — Jasmine Mochen Day
(74) *Attorney, Agent, or Firm* — Ansari Katiraei LLP; Arman Katiraei; Sadiq Ansari

(57) ABSTRACT

Disclosed is a selective encryption system that selectively encrypts sensitive image data within frames of a video stream and compresses other insensitive image data within the frames in order to generate and distribute a partially encrypted video stream that protects the sensitive image data without the time, energy, resource, and size penalty associated with encrypting all image data in all frames of the video stream. The system parses a video stream image into different regions that each contain different image data. The system detects first regions that contain the sensitive image data, encrypts the sensitive image data in the first regions, and compresses the image data in other second regions without encryption. The system distributes a selectively encrypted frame of the video stream that includes the encrypted image data for the first regions and the compressed image data for second regions.

20 Claims, 7 Drawing Sheets

(56)                    References Cited

U.S. PATENT DOCUMENTS

| | | | |
|---|---|---|---|
| 10,482,284 B1 * | 11/2019 | Tang .................... | G06F 21/6254 |
| 10,542,303 B2 * | 1/2020 | Braness ............... | H04N 21/435 |
| 11,589,090 B2 * | 2/2023 | Raju ....................... | A61P 35/00 |
| 2002/0129243 A1 * | 9/2002 | Nanjundiah ........ | H04L 63/0428 |
| | | | 713/160 |
| 2004/0028227 A1 * | 2/2004 | Yu ....................... | H04L 63/0428 |
| | | | 348/E7.056 |
| 2005/0237380 A1 * | 10/2005 | Kakii ..................... | H04N 7/147 |
| | | | 375/240.24 |
| 2007/0083467 A1 * | 4/2007 | Lindahl ........... | G11B 20/00195 |
| | | | 375/E7.009 |
| 2012/0260108 A1 * | 10/2012 | Lee ..................... | G06F 21/6218 |
| | | | 713/189 |
| 2017/0220816 A1 * | 8/2017 | Matusek ................ | G06V 10/25 |
| 2020/0252210 A1 * | 8/2020 | Sharfman ................. | H04L 9/14 |
| 2021/0042527 A1 * | 2/2021 | Ton-That ................ | G06F 16/51 |
| 2021/0329306 A1 * | 10/2021 | Liu ....................... | G06V 40/168 |
| 2022/0129556 A1 * | 4/2022 | Chen ....................... | G06F 21/74 |
| 2022/0198728 A1 * | 6/2022 | Glaser .................... | G06V 10/25 |
| 2022/0385907 A1 * | 12/2022 | Zhang .................... | H04N 19/91 |
| 2023/0050027 A1 * | 2/2023 | An ................... | G08B 13/19671 |
| 2023/0269422 A1 * | 8/2023 | Randall ........... | H04N 21/23476 |
| | | | 725/151 |

OTHER PUBLICATIONS

Peng et al., An ROI Privacy Protection Scheme for H.264 Video Based on FMO and Chaos, 2013 (Year: 2013).*
Roy et al., An Approach to Selective Encryption on Compressed Image, 2016, IEEE (Year: 2016).*
Carrillo et al, Compression Independent Reversible Encryption for Privacy in Video Surveillance, 2009 (Year: 2009).*
Cheung et al, Enhancing Privacy Protection in Multimedia Systems, 2009 (Year: 2009).*

Liu et al, Motion Vector Encryption in Multimedia Streaming, 2004, IEEE (Year: 2004).*
Ravishankar et al, Region Based Selective Image Encryption, 2006, IEEE (Year: 2006).*
Abeer et al discloses Light_Weight_Encryption_for_Medical_Images (Year: 2016).*
Roy—An Approach to Selective Encryption on Compressed Image 2016 IEEE (Year: 2016).*
Qin et al.—Flexible Lossy Compression for Selective Encrypted Image With Image Inpainting, 2019 IEEE (Year: 2019).*
Carrillo et al, discloses Compression Independent Reversible Encryption for Privacy in Video Surveillance, 2009 (Year: 2009).*
Cheung et al, discloses Enhancing Privacy Protection in Multimedia Systems, 2009 (Year: 2009).*
Liu et al discloses Motion Vector Encryption in Multimedia Streaming, 2004 IEEE (Year: 2004).*
Ravishankar et al, discloses Region Based Selective Image Encryption, 2006 IEEE. (Year: 2006).*
Laimoon et al discloses Light_Weight_Encryption_for_Medical_Images (Year: 2016).*
Peng et al discloses An_ROI_Privacy_Protection_Scheme_for_H.264_Video_Based_on_FMO_and_Chaos (Year: 2013).*
Chen et al, discloses Context-Aware Hierarchical Transformer for Fine-Grained Video-Text Retrieval—2022 IEEE (Year: 2022).*
Massoudi et al, discloses Overview on Selective Encryption of Image and Video: Challenges and Perspectives—2008 (Year: 2008).*
Chen et al, discloses Review of Recent Deep Learning Based Methods for Image-Text Retrieval—2020 IEEE (Year: 2020).*
Lu et al, discloses Secure Video Processing: Problems and Challenges—2011 IEEE (Year: 2011).*
Choo et al, discloses Semantic-Preserving Metric Learning for Video-Text Retrieval—2021 IEEE (Year: 2021).*
NVIDIA Developer, "Inventing Virtual Meetings of Tomorrow with NVIDIA AI Research", Oct. 5, 2020, online video available at www.youtube.com/watch?v=NqmMnjJ6GEg&t=56s [transcript provided].

* cited by examiner

Encrypted Blocks: 3, 4;
Encryption_X;
Compression_Y;
Quantization table

Encrypted Blocks: 7, 10, 11;
Encryption_X;
Compression_Y;
Quantization table

Encrypted Blocks: 7, 10, 11;
Encryption_X;
Compression_Y;
Quantization table

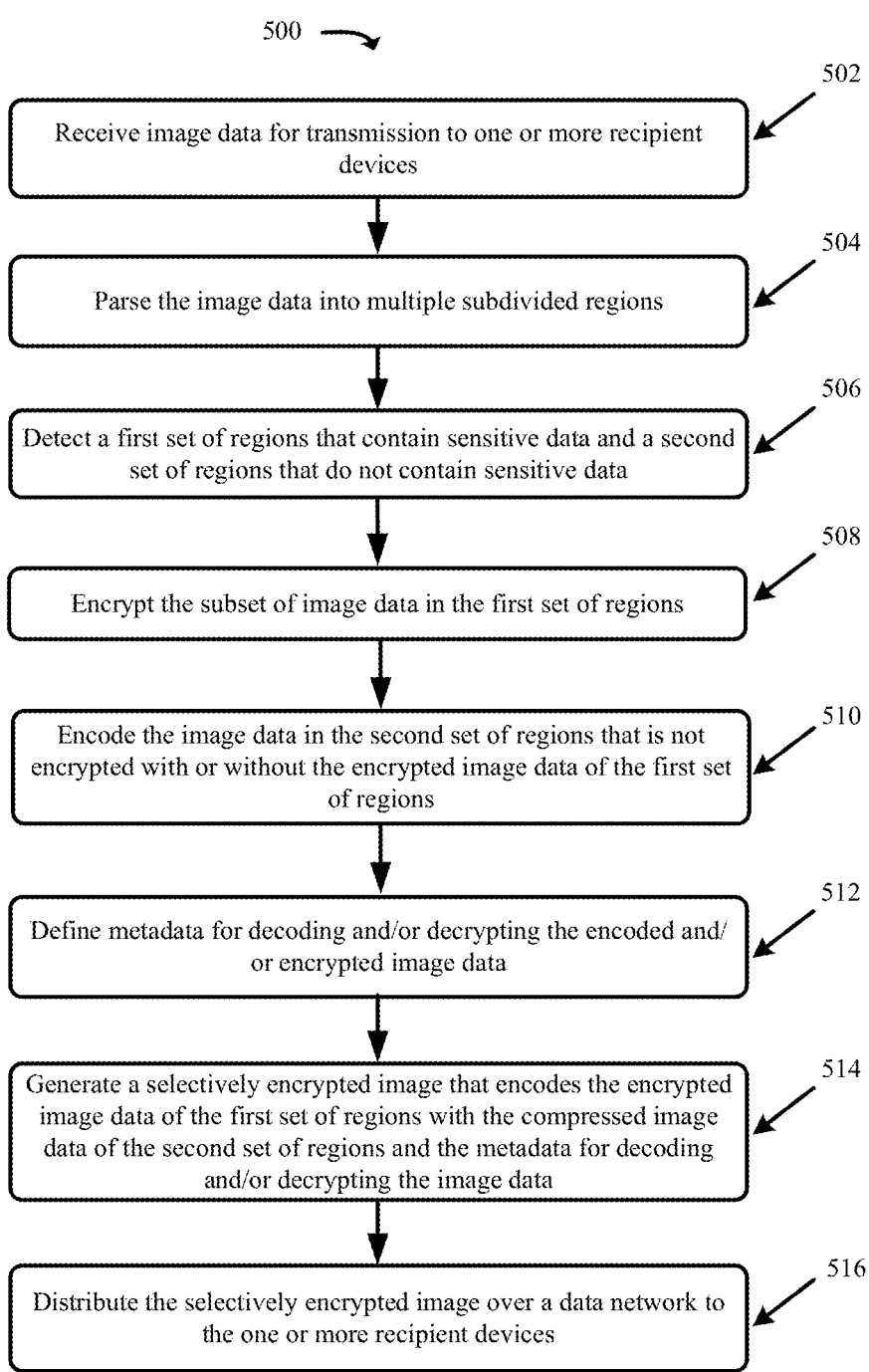

500

502
Receive image data for transmission to one or more recipient devices

504
Parse the image data into multiple subdivided regions

506
Detect a first set of regions that contain sensitive data and a second set of regions that do not contain sensitive data 508
Encrypt the subset of image data in the first set of regions 510
Encode the image data in the second set of regions that is not encrypted with or without the encrypted image data of the first set of regions 512
Define metadata for decoding and/or decrypting the encoded and/or encrypted image data 514
Generate a selectively encrypted image that encodes the encrypted image data of the first set of regions with the compressed image data of the second set of regions and the metadata for decoding and/or decrypting the image data 516
Distribute the selectively encrypted image over a data network to the one or more recipient devices

FIG. 5

SYSTEMS AND METHODS FOR SELECTIVE ENCRYPTION OF SENSITIVE IMAGE DATA

TECHNICAL FIELD

The present disclosure relates generally to the field of image and video encoding and encryption. Specifically, the present disclosure relates to systems and methods for the selective encryption of sensitive image data in frames of a video stream.

BACKGROUND

Video streams may contain sensitive information. For instance, confidential, private, or other sensitive information may be discussed during a video conference. If the audio is not encrypted, then attackers may intercept the audio stream packets during network transmission and may listen in on the discussion. Similarly, if the video is not encrypted, then the attackers may intercept the video stream packets during network transmission, may identify the participants, may observe their actions or behaviors, and/or may determine the exchanged sensitive dialog by reading the lips of the participants.

Encrypting all image data in all frames of the video stream is resource and time intensive. The encryption adds to the resources and time already spent on encoding, compressing, and/or transmitting the video stream. The additional resources and time may introduce delay in the transmission of the video stream or may require a more powerful machine to encrypt and compress the video stream in the time that is available to achieve a smooth frame rate.

BRIEF DESCRIPTION OF THE DRAWINGS

FIG. 5 presents a process for selectively encrypting sensitive image data within an image or a video stream frame in accordance with some embodiments presented herein.

DETAILED DESCRIPTION OF PREFERRED EMBODIMENTS

Figure 1:
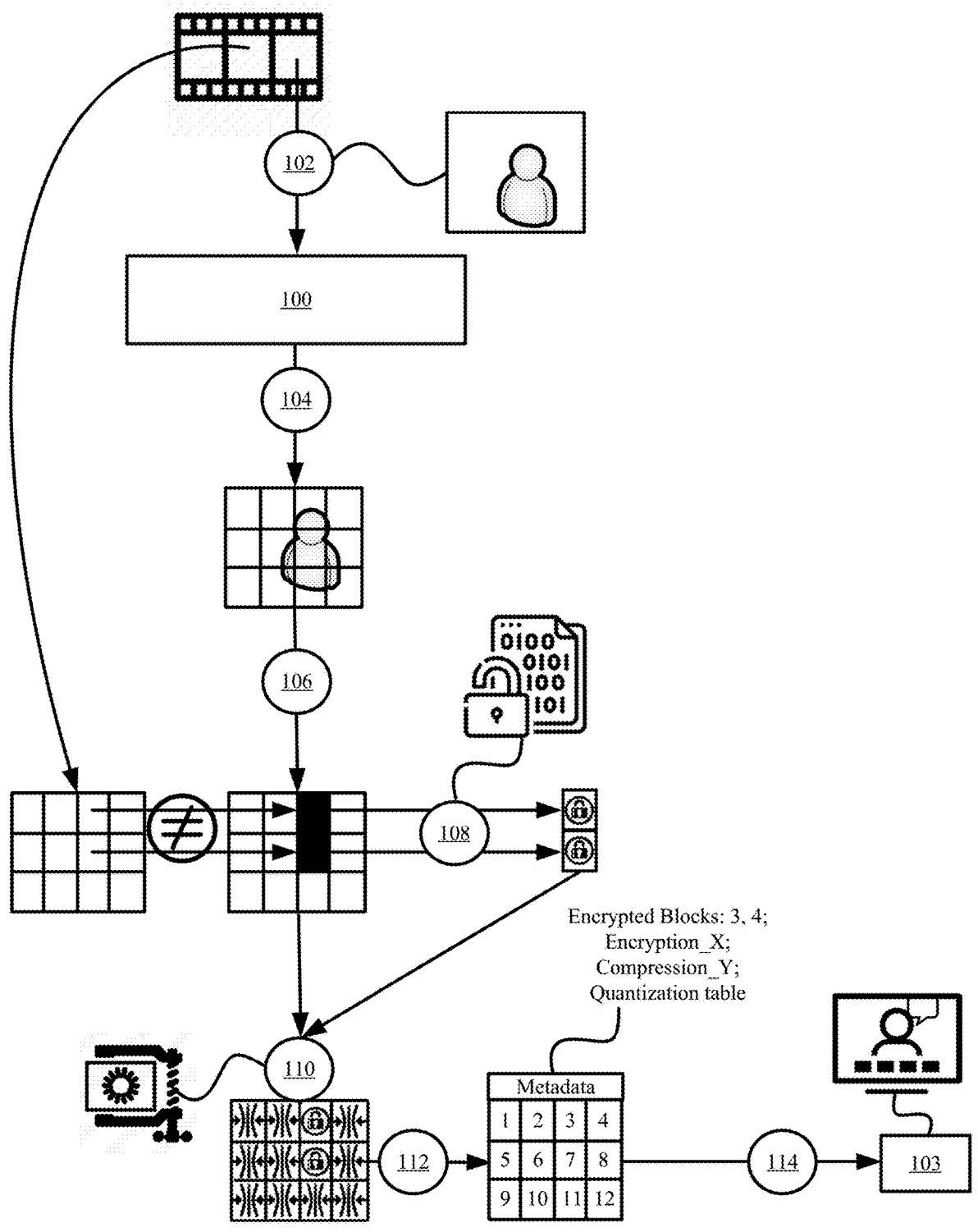
FIG. 1 illustrates an example of selectively encrypting a video stream frame based on a correlation between sensitive image data and motion in accordance with some embodiments presented herein.

The current disclosure provides a technological solution to the technological problem of compression, encryption, and video streaming. The technological solution includes a selective encryption system that selectively encrypts sensitive image data within frames of a video stream and compresses other insensitive image data within the frames. The selective encryption system generates and distributes a partially encrypted video stream that protects the sensitive image data without the time, energy, and resource penalty associated with encrypting all image data in all frames of the video stream.

The selective encryption system receives one or more images for a video stream that is to be distributed to different user devices over a data network. The selective encryption system parses the image data in the one or more images. The parsing may include partitioning the image data into macroblocks or regions that contains different subsets of the image data. The selective encryption system detects a first set of regions in an image that contain sensitive image data, encrypts the image data in the first set of regions, compresses, without encryption, the image data in a second set of regions that do not contain sensitive image data, and distributes a partially encrypted frame for the video stream to the different user devices. The partially encrypted frame includes the encrypted image data for the first set of regions and the compressed image data for the second set of regions.

In some embodiments, the selective encryption system compresses all the image data after the sensitive image data has been encrypted. For instance, the selective encryption system compresses the encrypted image data in the first set of regions with the unencrypted image data in the second set of regions to generate the partially encrypted frame.

In some embodiments, the selective encryption system detects the regions that contain the sensitive image data based on motion detected in those regions. Encrypting the regions with motion includes encrypting the parts of the image with facial expressions, eye blinks, lip movement, and/or other body movements. Consequently, detecting and encrypting the sensitive image data based on motion within the sensitive image data prevents attackers from determining the identities, expressions, responses, and/or dialog of the one or more persons in the images or video stream.

In some embodiments, the selective encryption system detects the regions that contain the sensitive image data using facial detection techniques. In some such embodiments, the selective encryption system encrypts the image data for the user face and/or head, thereby preventing attackers from discovering their identities, expressions, responses, and/or dialog via the video stream.

In some embodiments, the selective encryption system detects the regions that contain the sensitive image data using one or more artificial intelligence and/or machine learning ("AI/ML") techniques. The AI/ML techniques are trained with examples of sensitive image data, and may be used to refine the selection and encryption of sensitive image data to specific parts of the body or face. For instance, the AI/ML techniques may be trained to detect eyes and lips of different users, and the selective encryption system may limit the encryption to those sensitive regions.

Existing AI/ML techniques may be adapted for the selective encryption of the sensitive image data. For instance, one or more AI/ML techniques may be used to differentiate a person from a background and to blur the background. The selective encryption system inverts the selection to obtain the pixels that make up the person rather than the background. Instead of blurring the pixels representing the person, the selective encryption system selectively encrypts the pixels representing the person before compressing the remainder of the image data with or without the encrypted image data of the person.

In some embodiments, the selective encryption system encrypts all image data within a particular image or frame of the video stream, detects regions or sets of image data of the particular image or frame that contain or relate to insensitive image data, and selectively decrypts the encrypted image data for the regions containing or relating to the insensitive image data. The encryption may use existing encryption techniques without modification and/or may perform the insensitive image data detection in parallel with the encryption of the image data. For instance, a first thread or process encrypts a first copy of the image, and a second thread or process inputs a second copy of the image to an existing AI/ML technique that detects the image background corresponding to the insensitive image data. The selective encryption system then selectively decrypts the parts of the encrypted first copy of the image that represent the image background or the insensitive image data.

In any case, the selective encryption of sensitive image data protects the confidential, private, and/or other sensitive parts within individual frames of a video stream without devoting processing cycles, energy, and time to unnecessarily encrypt/decrypt the entirety of each frame and to unnecessarily protect all image data in every frame whether the image data is of value or not. Moreover, the selective encryption protects the sensitive image data while still reducing the overall size of the video stream by compressing the original image data within the regions of the image that do not contain sensitive image data.

Encryption introduces entropy. Specifically, encrypting image data involves scrambling that image data. The scrambling of the image data may prevent existing image or video compression techniques from identifying redundant or common pixel color values, detecting motion between common regions of different frames, and/or determining other commonality in an image or between images. Consequently, the compression techniques may be executed using the encrypted image data, but there may be little or no reduction in size of the encrypted image data because of the high entropy introduced from encryption and the inability of the compression techniques to analyze the image data for redundantly occurring color values, motion, and/or other image data that may be compressed or otherwise substituted with a smaller representation.

Since the sensitive image data (e.g., head or face of a user) typically occupies 50% or less of each video stream frame, the selective encryption allows the other 50% or more of each video stream frame to be compressed and reduced. Specifically, the selective compression system provides the original unencrypted image data from the other 50% or more regions of the video frames that do not contain sensitive image data for compression. The compression techniques produce compressed encodings of those regions (e.g., regions that do not contain sensitive image data). The selective compression system combines the encrypted encodings of the regions containing the sensitive image data with the compressed encodings of the regions that do not contain the sensitive image data to form a partially encrypted and partially compressed video stream frame for distribution over a data network to recipient devices.

FIG. 1 illustrates an example of selectively encrypting a video stream frame based on a correlation between sensitive image data and motion in accordance with some embodiments presented herein. Selective encryption system 100 receives (at 102) an image for inclusion or encoding as part of a video stream that is distributed to at least one recipient device.

The video stream may be part of a video conference, webinar, broadcast, program, or other event. For instance, the video stream may be one of many video streams that show different participants of the video conference. Accordingly, the image may be one in a sequence of images that is captured by a camera on a user device and that is selectively encrypted by selective encryption system 100 prior to distribution over a data network to the at least one recipient device. Alternatively, the video stream may include any video or multimedia content that contains some private, confidential, or sensitive information that the sender wishes to protect during transmission to the at least one recipient device.

Selective encryption system 100 parses (at 104) the image into different regions. Each region contains a subset of the image data or a set of pixels that form the image. In some embodiments, selective encryption system 100 parses (at 104) the image into regions that correspond to macroblocks used for image encoding or compression.

Selective encryption system 100 detects (at 106) motion in a first set of regions. Motion occurs when the image data or pixels in one region change from a previous image to the current image. Accordingly, selective encryption system 100 compares the parsed (at 104) regions of the image to corresponding regions from a previous image of the same video stream.

In some embodiments, selective encryption system 100 leverages the motion detection that is performed as part of image compression to detect (at 106) motion in the first set of regions. For instance, as part of Joint Photographic Experts Group ("JPEG") or Moving Picture Experts Group ("MPEG") image or video compression, macroblocks containing motion or no motion are identified for compression. Selective encryption system 100 may interrupt the image or video compression at the motion detection stage in order to identify the first set of regions with motion (e.g., that have changed from the previous frame).

Selective encryption system 100 encrypts (at 108) the image data in the first set of regions to prevent the rendering and/or viewing of the image data within these first set of regions if the image data is intercepted or otherwise received by an unintended recipient during transmission or distribution. Selective encryption system 100 may encrypt (at 108) the first set of regions using a symmetric key encryption algorithm or an asymmetric key encryption algorithm.

Selective encryption system 100 compresses (at 110) the image data in a second set of regions that do not contain motion. The second set of regions correspond to other parsed regions of the image that are not in the first set of regions and/or that contain image data that is not encrypted.

In some embodiments, selective encryption system 100 compresses (at 110) the image data in the second set of regions with the encrypted image data in the first set of regions. Compressing (at 110) the encrypted image data may produce little to no reduction in size because of the higher entropy associated with the obfuscated original image data and the lack of redundant or repeatable image data in the encrypted image data. Nevertheless, selective encryption system 100 may compress (at 110) the encrypted image data in the first set of regions with the unencrypted or original image data in the second set of regions to generate a single encoded file that contains the encrypted image data for the first set of regions and the unencrypted image data for the second set of regions.

Compressing (at 110) the image data may include using existing image or video compression techniques to produce a lossy or lossless encoding of the image. For instance, selective encryption system 100 may pause or interrupt the JPEG or MPEG compression at the motion detection stage, encrypt (at 108) the image data in the first set of regions with the detected motion, and resume the JPEG or MPEG compression to compress the image data in the second set of regions or all regions after encrypting the first set of regions. Accordingly, compressing (at 110) the image data may include encoding the image data in the second set of regions with or without the encrypted image data in the first set of regions using JPEG, MPEG, H.264, H.265, and/or other image or video compression codecs.

Selective encryption system 100 generates (at 112) a selectively encrypted image that includes the encrypted image data of the first set of regions and the compressed image data from the second set of regions of the image, and that further includes metadata for the decryption and decompression of the selectively encrypted image. The metadata may specify the location of the encrypted image data in the selectively encrypted image, the encryption that was used for the encrypted image data, and the compression that was used for the compressed image data. The metadata may also include the quantization table used to encode and/or compress the image data of the selectively encrypted image. In some embodiments, selective encryption system 100 encrypts the quantization table for additional security or protection.

Selective encryption system 100 distributes (at 114) the selectively encrypted image as a secure frame of the video stream to at least one recipient device 103. The encrypted image data of the first set of regions prevents unauthorized users or devices from decoding and viewing those parts of the image, although the compressed image data from the second set of regions may be decoded and viewed. Accordingly, the sensitive image data corresponding to a user's eyes, lips, and/or face will be part of the encrypted image data as the user's face will move when speaking, reacting to another, or even when remaining idle and listening as even a movement from one pixel to another may be sufficient to trigger the encryption of the user's face. The unencrypted regions of the selectively encrypted image correspond to a fixed background (e.g., a wall) that does not reveal any sensitive information about the user.

Distributing (at 114) the selectively encrypted image includes transmitting one or more data packets for the encrypted and compressed image data of the selectively encrypted image to recipient device 103 over a data network. In some embodiments, HyperText Transfer Protocol ("HTTP") Live Streaming ("HLS"), Dynamic Adaptive Streaming over HTTP ("DASH"), HTTP Dynamic Streaming ("HDS"), and/or other network streaming protocols are used to distribute (at 114) the selectively encrypted image and other selectively encrypted images of the video stream to recipient device 103. As noted above, the selectively encrypted image may be encoded as a JPEG, MEPG, H.264, H.265, or image or frame of another image or video compression codec. In some embodiments, selective encryption system 100 distributes (at 114) the selectively encrypted images of the video stream with an encrypted audio stream.

Selective encryption system 100 may use alternative techniques to identify and differentiate sensitive image data for encryption from other insensitive image data for compression. In some embodiments, selective encryption system 100 performs the selective encryption on image data representing user faces that are detected using facial detection.

Figure 2:
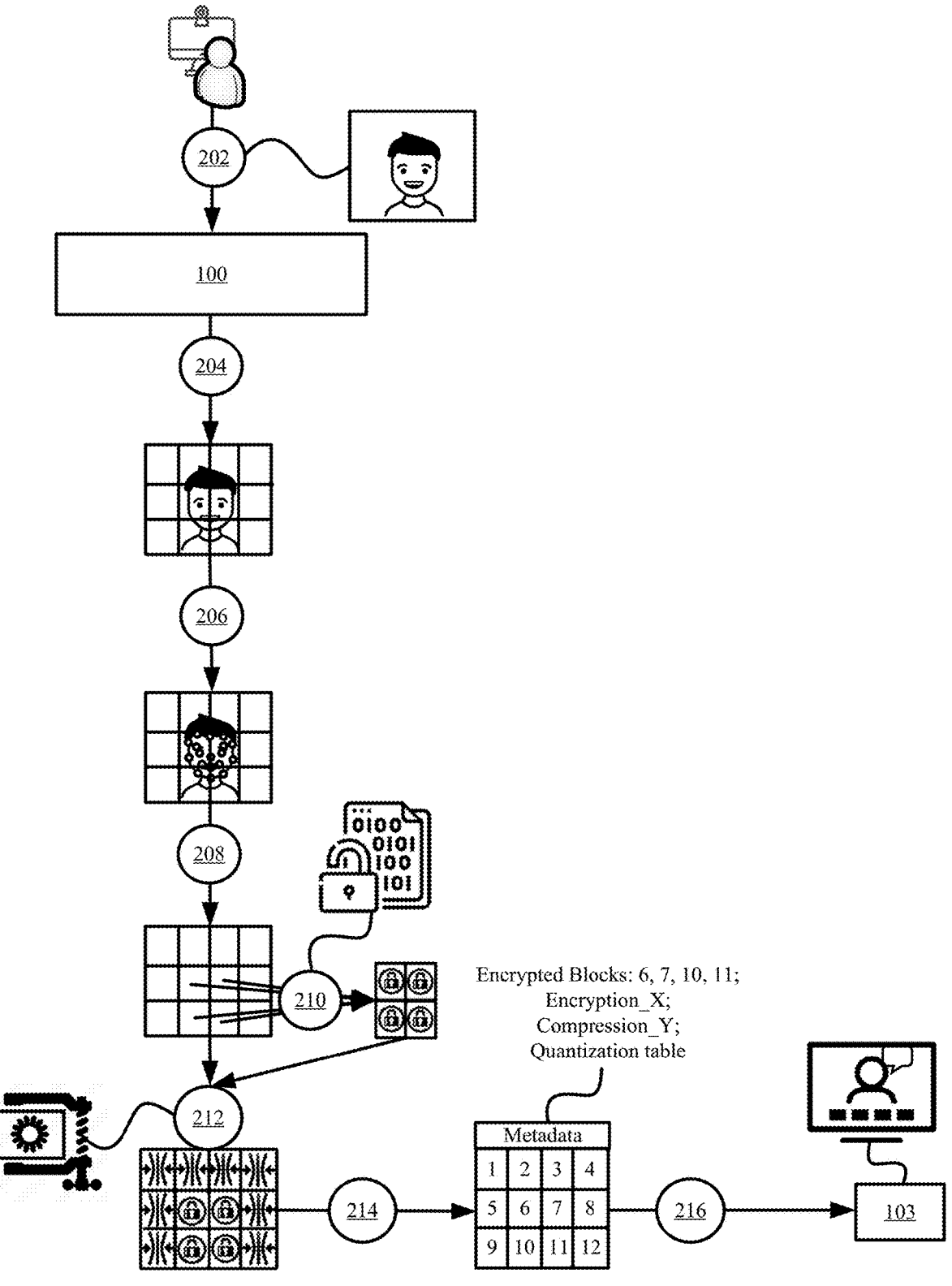
FIG. 2 illustrates an example of selectively encrypting a video stream frame using facial detection in accordance with some embodiments presented herein.

FIG. 2 illustrates an example of selectively encrypting a video stream frame using facial detection in accordance with some embodiments presented herein. Selective encryption system 100 receives (at 202) an image for inclusion or encoding as part of a video stream that is distributed to at least one recipient device.

Selective encryption system 100 parses (at 204) the image into macroblocks or regions of different image data. Selective encryption system 100 performs (at 206) facial detection over the image data, and selects (at 208) the regions with identified facial features for encryption. The facial detection compares the image data against one or more facial models. The facial models may define one or more shapes or forms for differentiating facial features (e.g., eyes, nose, mouth, ears, etc.) from other objects, and/or may define color patterns that assist in the facial feature detection.

Selective encryption system 100 encrypts (at 210) the image data in the selected regions, and compresses (at 212) the image data in other regions with or without the encrypted image data from the selected regions. Selective encryption system 100 generates (at 214) the selectively encrypted image, and distributes (at 216) the selectively encrypted image to recipient device 103.

Figure 3:
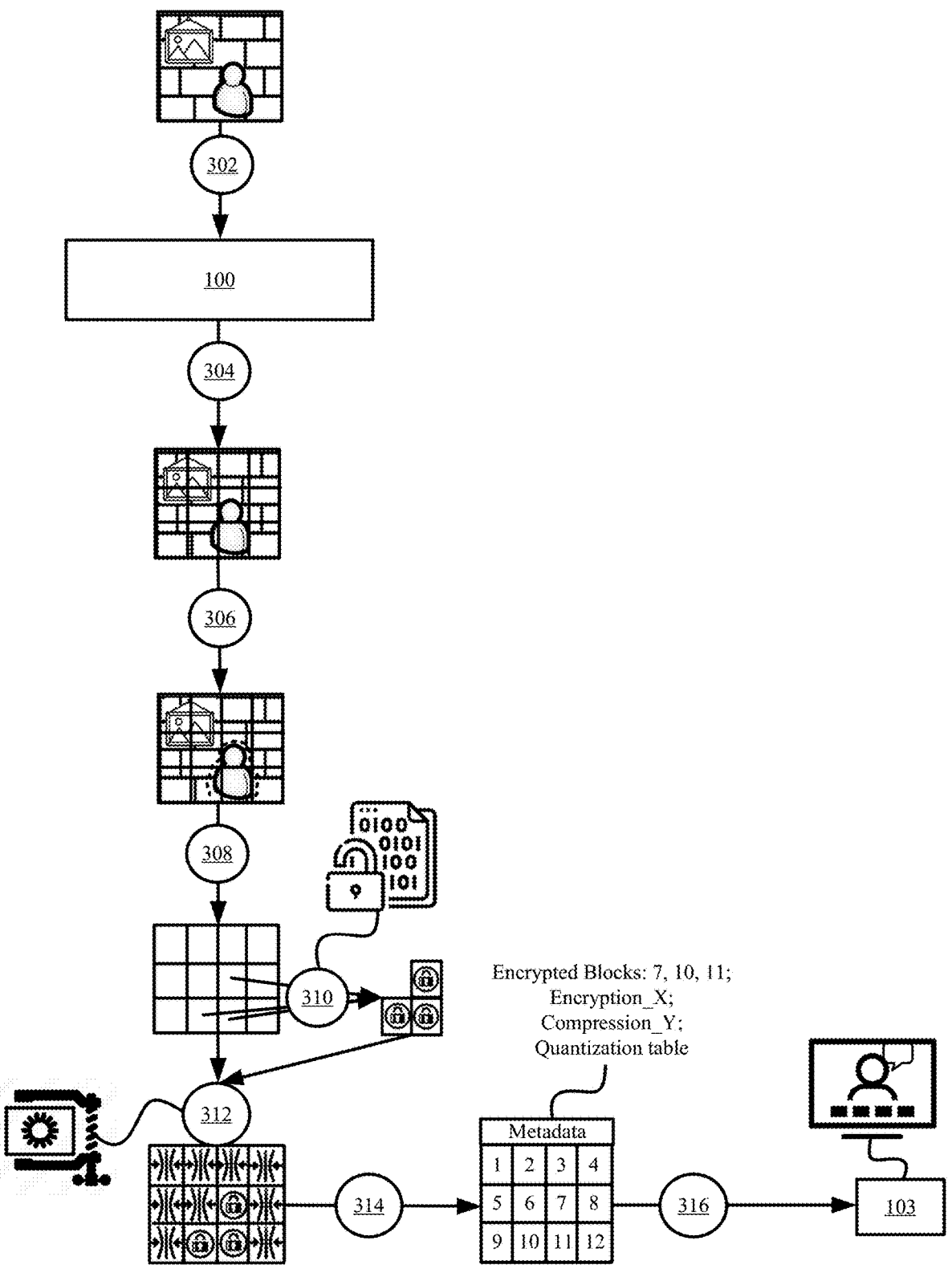
FIG. 3 illustrates an example of selectively encrypting a video stream frame based on artificial intelligence and/or machine learning ("AI/ML") detection of sensitive image data in accordance with some embodiments presented herein.

FIG. 3 illustrates an example of selectively encrypting a video stream frame based on AI/ML detection of sensitive image data in accordance with some embodiments presented herein. Selective encryption system 100 receives (at 302) an image for inclusion or encoding as part of a video stream that is distributed to at least one recipient device.

Selective encryption system 100 parses (at 304) the image into regions, and inputs the image data from the parsed regions into one or more AI/ML object differentiation techniques. The AI/ML techniques analyze the image data, and differentiate (at 306) specific objects, movements, and/or features in the image data that are associated with sensitive information and/or are classified as sensitive.

In some embodiments, selective encryption system 100 adapts existing AI/ML techniques for the sensitive image data detection. For instance, existing AI/ML techniques differentiate (at 306) static elements (e.g., inanimate objects) from moving elements (e.g., persons), background elements from foreground elements, human forms from non-human forms, etc. so that the static elements, background elements, and/or non-human forms are blurred out or replaced with a virtual background.

Selective encryption system 100 selects (at 308) a first set of regions that contain the image data for the moving elements, foreground elements, and/or human forms for encryption and a second set of regions that contain the image data for the non-moving elements, background elements, and/or non-human forms for compression based on the AI/ML image analysis and object detection. Selective encryption system 100 encrypts (at 310) the image data in the first set of regions, and compresses (at 312) the image data in second set of regions with or without the encrypted image data from the first set of regions.

Selective encryption system 100 generates (at 314) the selectively encrypted image that encodes the encrypted and/or compressed image data of the first set of regions and the compressed image data of the second set of regions in a single file, and that includes the metadata for decompressing and decrypting the image data from the selectively encrypted image. Selective encryption system 100 distributes (at 316) the selectively encrypted image to recipient device 103.

Figure 4:
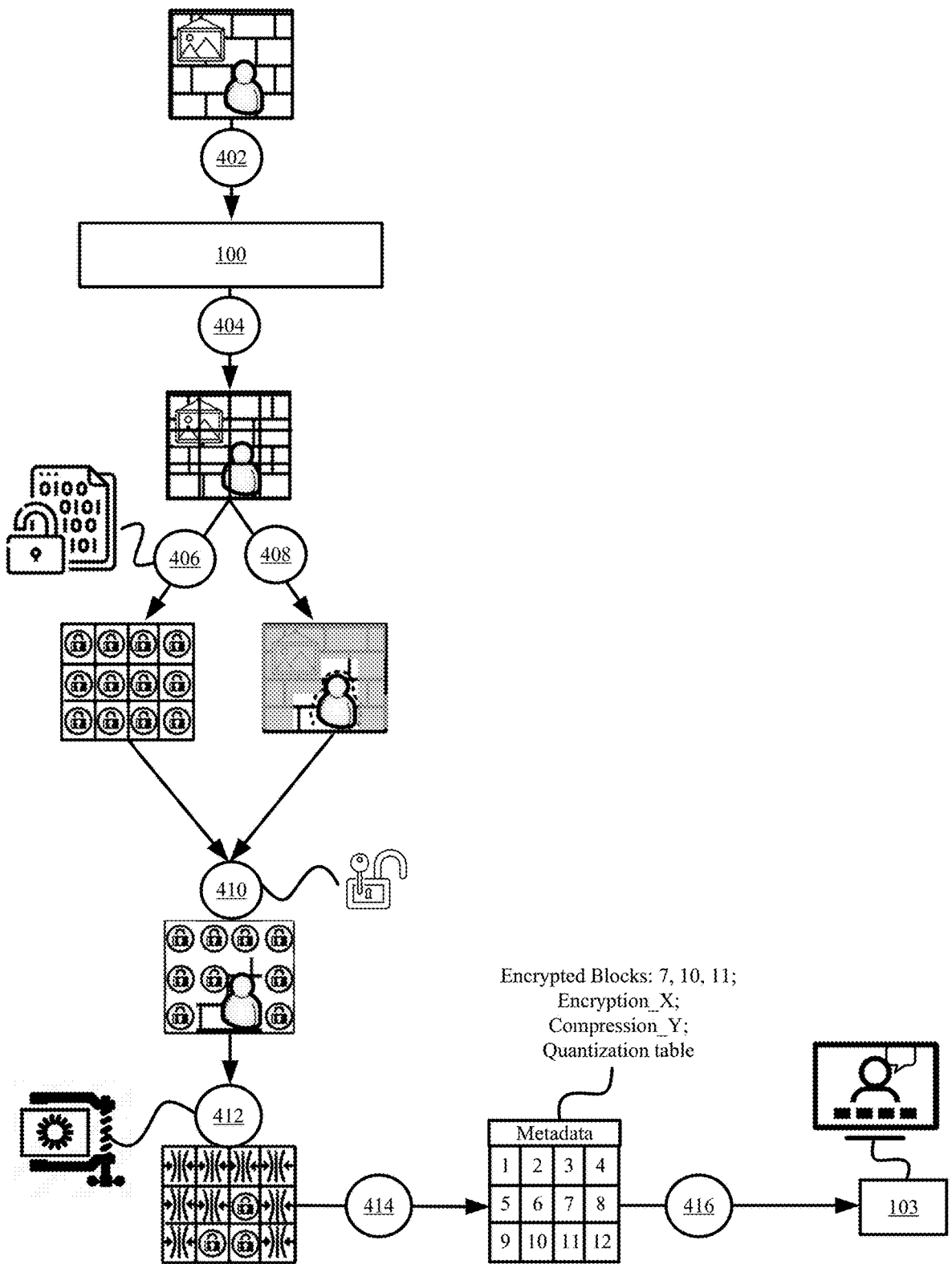
FIG. 4 illustrates an example of generating the selectively encrypted image via a selective decryption of insensitive image data in accordance with some embodiments presented herein.

FIG. 4 illustrates an example of generating the selectively encrypted image via a selective decryption of insensitive image data in accordance with some embodiments presented herein. Selective encryption system 100 receives (at 402) an image for inclusion or encoding as part of a video stream that is distributed to at least one recipient device.

Selective encryption system 100 parses (at 404) the image into regions, passes a first copy of the image data from the parsed regions to a first thread or process, and passes a second copy of the image data from the parsed regions to a second thread or process. The first thread or process encrypts (at 406) the image data from each of the parsed regions. The second thread or process inputs the image data from each of the parsed regions into one or more AI/ML object differentiation techniques which differentiates (at 408) specific objects, movements, and/or features in the image data that are associated with insensitive information and/or are classified as insensitive. For instance, the one or more AI/ML object differentiation techniques identify the parsed regions that correspond to a background of the image or inanimate objects of the image.

Selective encryption system 100 selectively decrypts (at 410) the encrypted image data from a subset of the regions that were encrypted by the first thread or process and that correspond to the subset of regions that the second thread or process identified as containing insensitive image data. Selective encryption system 100 compresses (at 412) the decrypted image data from the subset of regions with or without the encrypted image data from the other regions. Selective encryption system 100 generates (at 414) the selectively encrypted image that encodes the encrypted and/or compressed image data from the remaining encrypted regions and the compressed image data of the decrypted subset of regions in a single file, and that includes the metadata for decompressing and decrypting the image data from the selectively encrypted image. Selective encryption system 100 distributes (at 416) the selectively encrypted image to recipient device 103.

FIG. 5 presents a process 500 for selectively encrypting sensitive image data within an image or a video stream frame in accordance with some embodiments presented herein. Process 500 is implemented by selective encryption system 100.

In some embodiments, selective encryption system 100 runs on a streaming or video conferencing device. For instance, the video conferencing device may include a desktop, laptop, tablet, smartphone, or other computing device with a camera for capturing a video feed of a user participating in a conference, and a display to present video feeds of other users participating in the conference.

The video conference device includes processing, memory, storage, network, and/or other hardware resources that selective encryption system 100 uses to selectively encrypt the local video feed, distribute the selectively encrypted video feed to other devices connected to the same conference or to a central server that generates and distributes the unified feed of all participants, and decrypt and decompress the selectively encrypted video feed received from other video conferencing devices.

Process 500 includes receiving (at 502) image data for transmission to one or more recipient devices. A camera of the video conference device or of another device may capture the image data. The image data may be a first of a sequence of images or frames of a video stream or video content that is to be selectively encrypted prior to transmission to the one or more recipient devices. Alternatively, the image data may correspond to a frame of recorded video content that a set of authorized recipient devices are permitted to view. For instance, selective encryption system 100 may be part of a video distribution platform. The image data may be part of video content that select subscribers are permitted to view, and the selective encryption encrypts the video content to prevent other subscribers or non-subscribers from viewing the video content.

Process 500 includes parsing (at 504) the image data into multiple subdivided regions. In some embodiments, selective encryption system 100 parses (at 504) the image data according to an image or video compression codec. For instance, the image or video compression codec may parse the image data into macroblocks. In some embodiments, selective encryption system 100 divides the image data into subsets of image data or pixels that are located in different regions of the overall image. Each region may be the same size or contain the same number of pixels.

Process 500 includes detecting (at 506) a first set of regions that contain sensitive data and a second set of regions that do not contain sensitive data. Detecting (at 506) the sensitive data in the first set of regions includes analyzing the image data in each region according to a set of differentiating criteria. The analysis may include comparing the image data in each region to the differentiating criteria, determining a difference in the image data of each region relative to its neighboring regions and comparing the difference between neighboring regions to the differentiating criteria, and/or determining a difference in the image data of each region relative to the image data of the same region in one or more previous images or frames of the same video content and comparing the difference between the same region of different frames to the differentiating criteria.

In some embodiments, the differentiating criteria differentiate sensitive image data from insensitive image data based on the image data in a particular region changing by one or more pixels in one image to a next. In some such embodiments, selective encryption system 100 detects (at 506) a region that contains sensitive data based on the color values defined for that region changing from a previous image or frame.

In some embodiments, the differentiating criteria are defined as one or more facial detection models. Selective encryption system 100 applies the one or more facial detection models to the image data in order to detect (at 506) the first set of regions that contain image data in the shape, form, and/or other characteristics of a face represented by the one or more facial detection models. For instance, a facial detection model may define a nose shape in between and below oval shapes of an eye and above oval shapes of lips. Selective encryption system 100 performs the facial detection by overlaying the facial detection model over the image data, adjusting the sizing and positioning of the facial detection model, and determining if the features in the image data match the facial detection model by a threshold amount.

In some embodiments, the differentiating criteria are defined based on the supervised or unsupervised training of one or more AI/ML techniques. For instance, selective encryption system 100 trains one or more AI/ML techniques to detect and classify text as sensitive information by providing examples of different fonts, textual characters, and/or other symbols that are representative of the sensitive information as inputs during the training phase of the one or more AI/ML techniques. The AI/ML techniques develop a model based on the patterns or commonality amongst the shapes, forms, and/or other characteristics of the training fonts and textual characteristics. Accordingly, detecting (at 506) the sensitive data may include rendering the image data, inspecting the rendered image data for the presence of textual characters, and detecting (at 506) the first set of regions that contain forms, shapes, and/or other characteristics that were modeled for the fonts and textual characteristics of the sensitive information. Other models may be trained to detect and classify examples of different human faces, shapes of the human head, or regions above and below a human nose as sensitive information.

In some other embodiments, the AI/ML techniques may be based on Convolutional Neural Network ("CNN") that perform image segmentation and/or edge detection. The image segmentation involves mapping each pixel of the received image to a particular class. In the case of a human face, the class may be one of a background, hair, ears, nose, lips, and other facial features. The pixels may be mapped based on their coloring and/or the coloring of neighboring pixels.

In some embodiments, to preserve processing resources, selective encryption system 100 repurposes outputs at different stages of an image or video encoding codec or conferencing solution feature in order to detect (at 506) the sensitive image data in the first set of regions. For instance, image or video compression codecs perform motion detection by comparing consecutive images of a video and determining whether to encode the images as keyframes (e.g., "I" frames), predictive frames ("P" frames), or bi-directional predicted frames ("B" frames) based on the amount of detected motion or change in the images. Selective encryption system 100 may add an interrupt to the image or video compression codecs in order to identify the first set of regions that contain motion or change that correspond to regions with sensitive data. Alternatively, a video conferencing feature may include automatically detecting a conference participant and blurring the background or image regions surrounding the outline of the conference participant. The video conferencing feature may use AI/ML or other methodologies to differentiate and select the background for blurring. Selective encryption system 100 may obtain the selected background image data, may invert the selection to select the image data representing a user that will not be blurred, and may detect (at 506) the first set of regions as a result of inverting the image data that is selected as part of the video conference feature for blurring backgrounds.

Process 500 includes encrypting (at 508) the subset of image data in the first set of regions. The Advanced Encryption Standard ("AES"), the Secure Hash Algorithm ("SHA"), and/or other encryption algorithms may be used to encrypt (at 508) the image data in the first set of regions.

The encryption (at 508) involves scrambling the color information for the pixels in the first set of regions via a secure cryptographic hash. Consequently, rendering the encrypted image data produces a visualization that differs from the visualization created from rendering the original unencrypted image data of the first set of regions.

In some embodiments, the encryption keys (e.g., cryptographic keys) are exchanged or negotiated when the device executing selective encryption system 100 joins a conference. Specifically, selective encryption system 100 and the one or more recipient devices provide authorization credentials to join the conference. Once authorized, an encryption handshake is performed by the authorized devices, and the keys for encrypting and decrypting the sensitive image data are determined prior to the creation and distribution of the selectively encrypted video streams.

Process 500 includes encoding (at 510) the image data in the second set of regions that is not encrypted with or without the encrypted image data of the first set of regions. The encoding (at 510) represents the image data in a supported image or streaming protocol format. The image data may be encoded (at 510) using lossy or lossless codecs.

For instance, the image data may be encoded (at 510) using JPEG, MPEG, or other image or video encoding codecs.

A lossy encoding (at 510) includes compressing the image data in the second set of regions with or without compressing the encrypted image data of the first set of regions. The compression may include encoding the motion or change that occurs between macroblocks or regions of the current image and a previous image rather than all the image data of the current image, replacing redundant or recurring color values of multiple pixels with a single set of values, eliminating low frequency or out-of-range values that do not materially impact the image, and/or otherwise representing the image data in the regions with a smaller or alternative set of image data.

In some embodiments, encoding (at 510) the image data may include converting the original image data from a first color space to a different second color space or to their respective chroma channels, applying chroma sub sampling, performing a Discrete Cosine Transformation ("DCT") to determine the frequency components within the chroma subsampled image data in each region, generating a quantization table with values that preserve the low-frequency detail and discard the high-frequency detail (e.g., remove noise or color, brightness, and/or contrast values that are imperceptible or that do not material affect what the human eye sees), and/or representing the image data in a compressed and/or encoded format based on the DCT frequency components and the quantization table values. For increased security and further protection from unauthorized users viewing the sensitive data, selective encryption system 100 may also encrypt the quantization table using the same encryption that was used for encrypting (at 508) the image data of the first set of regions.

Process 500 includes defining (at 512) metadata for decoding and/or decrypting the encoded and/or encrypted image data. In some embodiments, the metadata includes an encryption header that specifies the regions that contain the encrypted data, and the encryption (e.g., encryption format and version, cipher algorithm, mode specification, and/or information used to secure the encryption key) that was used. The metadata further includes the applied compression, the codec that was to encode the image data, and/or the quantization table for the DCT encoding of the image data. By referencing the metadata, the receiving device may select the correct codec to decode and decompress the image data, the encryption keys needed to decrypt the decoded and/or decompressed encrypted image data, and the subset of image data that remains encrypted after the decompression and/or decoding.

Process 500 includes generating (at 514) a selectively encrypted image that encodes the encrypted image data of the first set of regions with the compressed image data of the second set of regions and the metadata (e.g., encryption header) for decoding and/or decrypting the image data. For instance, the selectively encrypted image may be a JPEG, Transport Stream ("TS"), or other file with encoded image data for a single image, a video stream, or other video content.

Process 500 includes distributing (at 516) the selectively encrypted image over a data network to the one or more recipient devices. In some embodiments, selective encryption system 100 distributes (at 516) the selectively encrypted image in response to requests from the one or more recipient devices for the video stream or the image that includes the received (at 502) image data. In some other embodiments, selective encryption system 100 distributes (at 516) the selectively encrypted image while connected to a live video conference, webinar, or other video stream.

Figure 6:
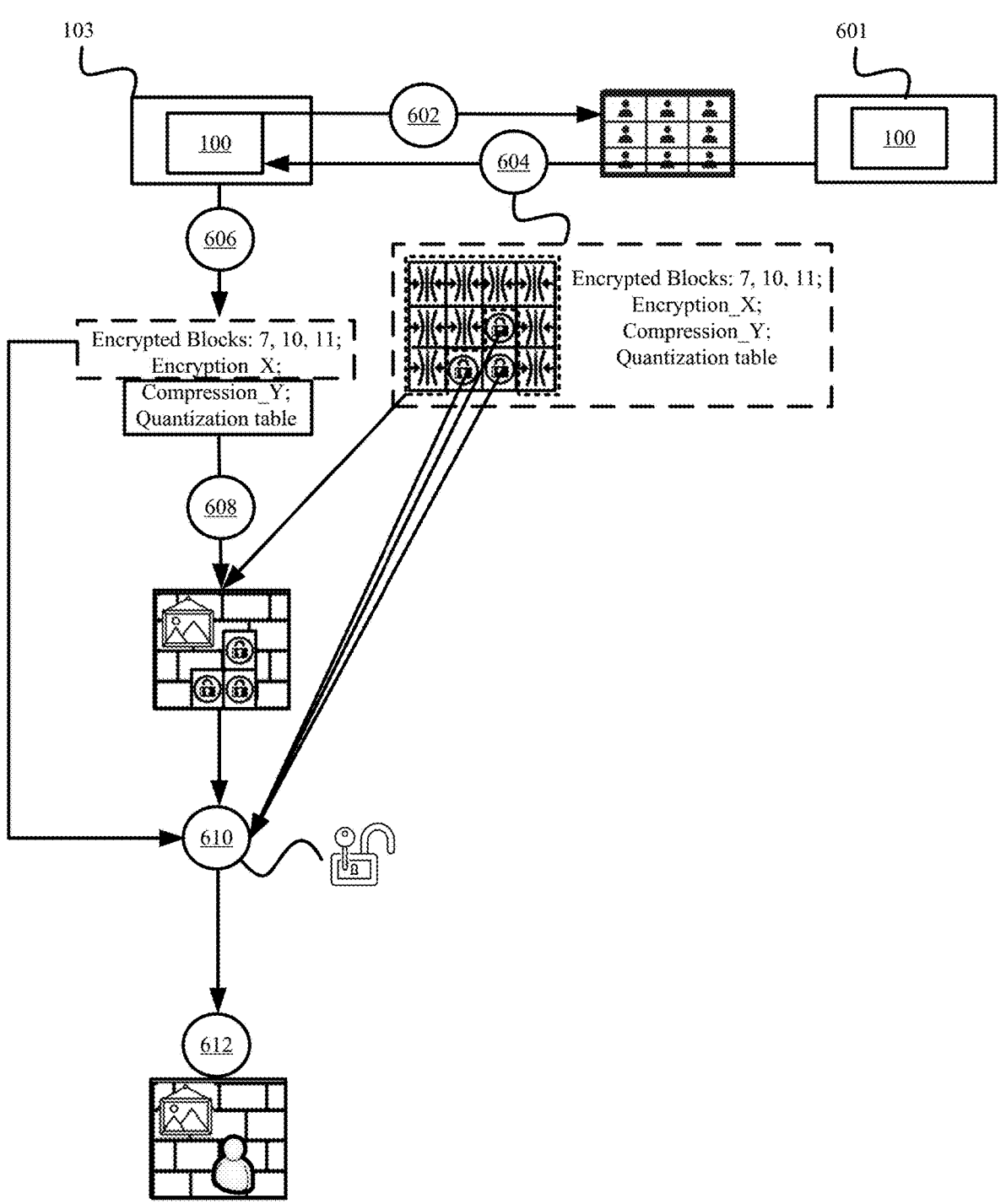
FIG. 6 illustrates an example of decoding a selectively encrypted image in accordance with some embodiments presented herein.

FIG. 6 illustrates an example of recipient device 103 decoding a selectively encrypted image in accordance with some embodiments presented herein. Recipient device 103 may include a computing system that is used to access and view secured video content, or a computing system that connects to and participates in a video conference, webinar, and/or another event. Recipient device 103 may run an instance of selective encryption system 100, and may also generate its own selectively encrypted video stream that is distributed to other devices participating in the same video conference or webinar. Accordingly, the instance of selective encryption system 100 running on recipient device 103 is used to generate the selectively encrypted images for the video stream that recipient device 103 distributes to other devices, and to decode and decrypt the selectively encrypted images or video streams that are received from the other devices.

Recipient device 103 connects (at 602) or joins a video conference with at least one other participating device 601. Connecting (at 602) to the video conference includes providing secure access credentials to authorize recipient device 103 as a valid or invited participant of the video conference. In some embodiments, recipient device 103 connects (at 602) to the video conference via a conference management system.

Recipient device 103 receives (at 604) a selectively encrypted image as part of a video stream that originates from participating device 601. Recipient device 103 passes the selectively encrypted image to the instance of selective encryption system 100 running on recipient device 103.

Selective encryption system 100 extracts (at 606) the metadata from the selectively encrypted image. From the metadata, selective encryption system 100 determines the codec that was used to encode the selectively encrypted image, and that may be used to decode the selectively encrypted image.

Selective encryption system 100 decodes (at 608) the selectively encrypted image. In some embodiments, selective encryption system 100 decodes (at 608) all image data of the selectively encrypted image when the encrypted image data is encoded and/or compressed with the unencrypted image data. In some other embodiments, selective encryption system 100 determines the location of the encoded and unencrypted image data in the selectively encrypted image based on the extracted (at 606) metadata, and decodes (at 608) the subset of the image data that was encoded but not encrypted.

Decoding (at 608) the selectively encrypted image includes decompressing the image data. The metadata identifies the compression that was used, and selective encryption system 100 decompresses the image data based on the identified compression.

Selective encryption system 100 references the metadata to identify the regions or blocks of image data that are encrypted within the selectively encrypted image and the encryption algorithm that was to encrypt that image data. Selective encryption system 100 obtains the encryption keys for decryption. In some embodiments, selective encryption system 100 exchanges or negotiates the encryption keys for encryption and/or decryption when connecting (at 602) to the conference. In some other embodiments, an encryption handshake is performed upon connecting (at 602) to the conference that enables selective encryption system 100 to use one or more private keys for decryption. Selective encryption system 100 decrypts (at 610) the encrypted image data from the identified regions or blocks of the selectively encrypted image.

Selective encryption system 100 renders (at 612) the decoded and/or decompressed image data from the second set of regions of the selectively encrypted image that do not contain sensitive data with the decoded and/or decrypted image data from the first set of regions of the selectively encrypted image that do contain sensitive data. The results of the rendering produce a lossless or lossy visualization of the image captured by participant device 601.

Figure 7:
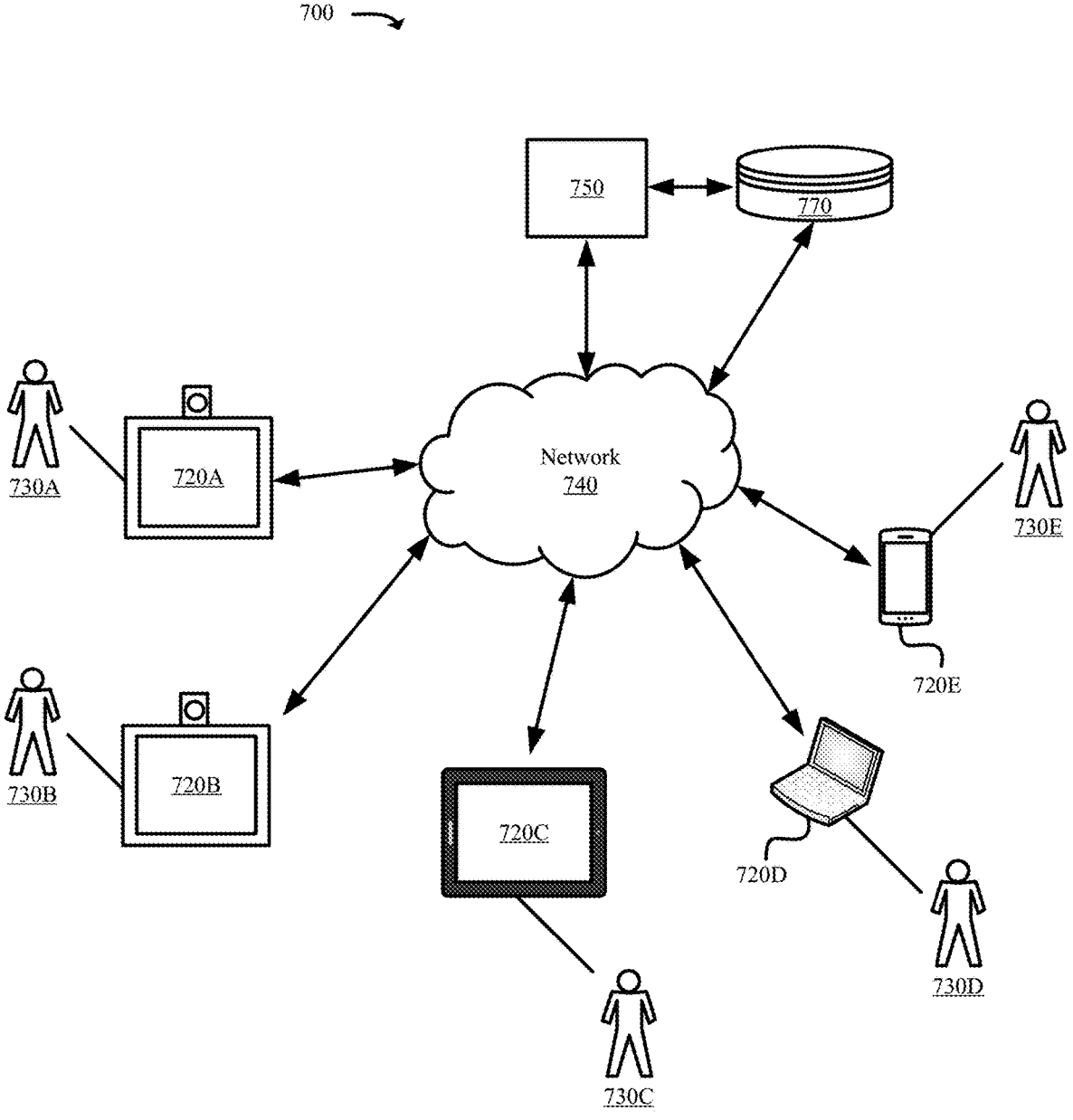
FIG. 7 shows an example of a conference management system in which various implementations as described herein may be practiced.

FIG. 7 shows an example of a conference management system 700 in which various implementations as described herein may be practiced. Conference management system 700 enables a plurality of users to schedule conferences, and receive notification regarding the conference. In some examples, one or more components of conference management system 700, such as conference management server 750, can be used to implement computer programs, applications, methods, processes, or other software to perform the described techniques and to realize the structures described herein. For instance, in some embodiments, conference management server 750 runs one or more instances of selective encryption system 100 for the encryption and encoding as well as the decryption and decoding of the selectively encrypted images and/or video streams.

As shown in FIG. 7, conference management system 700 includes one or more user devices 720A-720E (collectively, referred to as user devices 720), network 740, conference management server 750, and database 770. The components and arrangements shown in FIG. 7 are not intended to limit the disclosed embodiments, as the system components used to implement the disclosed processes and features can vary.

Network 740 facilitates communications and sharing of the selectively encrypted video streams and conference scheduling content between user devices 720 (some or all) and/or conference management server 750. Network 740 may be any type of network that provides communications, exchanges information, and/or facilitates the exchange of information between conference management server 750 and user devices 720. For example, network 740 broadly represents one or more local area networks ("LANs"), wide area networks ("WANs"), metropolitan area networks ("MANs"), global interconnected internetworks, such as the public internet, public switched telephone networks ("PSTN"), or other suitable connection(s) or combination thereof that enables conference management system 700 to send and receive information between the components of conference management system 700. Each such network 740 uses or executes stored programs that implement internetworking protocols according to standards such as the Open Systems Interconnect ("OSI") multi-layer networking model, including but not limited to Transmission Control Protocol ("TCP") or User Datagram Protocol ("UDP"), Internet Protocol ("IP"), HTTP, and so forth. All computers described herein are configured to connect to network 740 and the disclosure presumes that all elements of FIG. 7 are communicatively coupled via network 740. Network 740 may support a variety of electronic messaging formats, and may further support a variety of services and applications for user devices 720.

Conference management server 750 may be a computer-based system including computer system components, desktop computers, workstations, tablets, hand held computing devices, memory devices, and/or internal network(s) connecting the components. Conference management server 750 may be configured to provide conference services, such as setting up conference sessions for users 730A-730E (collectively, referred to as users 730). Conference management server 750 may be configured to receive information from user devices 720 over network 740, process the information, store the information, and/or transmit conference scheduling information to user devices 720 over network 740. For example, conference management server 750 may be configured to analyze images, video signals, and audio signals sent by users 730A-730E, and analyze the received content for generating corresponding notifications to the users. In some embodiments, conference management server 750 runs one or more instances of selective encryption system 100, and performs the selective encryption and decryption on behalf of user devices 720A-720E.

In some embodiments, the functionality of conference management server 750 described in the present disclosure is distributed among one or more of user devices 720A-720E. For example, one or more of user devices 720A-720E may perform functions such as determining the degree of formality of the conference, and providing related information to the conference management server, or the other user devices.

Database 770 includes one or more physical or virtual storages coupled with the conference management server 750. Database 770 is configured to store conference information received from user devices 720, profiles of users 730 such as contact information and images of users 730, determined degrees of formality of the conferences, data used for determining degrees of formality, and data used for determining deviations from appropriate demeanors associated with a certain degree of formality. Database 770 may further include images, audio signals, and video signals received from user devices 720. The data stored in database 770 may be transmitted to conference management server 750 for information analysis and notification generation. In some embodiments, database 770 is stored in a cloud-based server (not shown) that is accessible by conference management server 750 and/or user devices 720 through network 740. While database 770 is illustrated as an external device connected to conference management server 750, database 770 may also reside within conference management server 750 as an internal component of conference management server 750.

As shown in FIG. 7, users 730A-730E may communicate with conference management server 750 using various types of user devices 720A-720E via network 740. As an example, user devices 720A, 720B, and 720D include a display such as a television, tablet, computer monitor, video conferencing console, or laptop computer screen. User devices 720A, 720B, and 720D may also include video/audio input devices such as a video camera, web camera, or the like. As another example, user devices 720C and 720E include mobile devices such as a tablet or a smartphone having display and video/audio capture capabilities. User devices 720A-720E may also include one or more software applications that facilitate the user devices to engage in communications, such as IM, text messages, EMAIL, VOIP, video conferences, with one another. In some embodiments, user devices 720A-720E implement and run different instances of selective encryption system 100 to allow for the exchange of the selectively encrypted images and video content directly between user devices 720A-720E.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency ("RF"), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the description.

What is claimed is:

1. A computer-implemented method for selective encryption of image data, the computer-implemented method comprising:

training a machine learning model to detect different types of sensitive image data based on visual examples comprising text and visual elements;

joining one or more user devices to a secured video conference based on the one or more user devices providing secure access credentials that authorize secure access to the secured video conference;

parsing an image that is generated for a video stream of the secured video conference into a plurality of regions, wherein each region of the plurality of regions comprises different image data of the image;

spawning a first thread or process and a second thread or process to execute in parallel;

analyzing the plurality of regions in a first copy of the image for the sensitive image data with execution of the first thread or process;

detecting, by execution of the first thread or process, a first set of regions from the plurality of regions that contain sensitive image data by comparing the different image data in the plurality of regions to the machine learning model, wherein detecting the first set of regions comprises detecting image data in one or more regions of the first set of regions that matches to one type of sensitive image data trained in the machine learning model;

encrypting the sensitive image data in the first set of regions by:

encrypting the plurality of regions in a second copy of the image with the second thread or process; and selectively decrypting a second set of regions from the plurality of regions in the second copy of the image that were encrypted by the second thread or process and that were determined to not contain the sensitive image data by the first thread or process when detecting the first set of regions; and distributing a selectively encrypted frame to at least one of the one or more user devices, the selectively encrypted frame comprising encrypted image data for the first set of regions and unencrypted image data for the second set of regions.

2. The computer-implemented method of claim 1, wherein detecting the first set of regions that contain the sensitive image data further comprises:

detecting a change in the image data of the first set of regions between a previous image of the video stream and the image that is a current image of the video stream; and selecting the sensitive image data of the first set of regions for encryption in response to detecting the change in the image data of the first set of regions and a motion associated with the change matching the one type of sensitive image data trained in the machine learning model.

3. The computer-implemented method of claim 1, wherein detecting the first set of regions that contain the sensitive image data further comprises:

detecting motion in the first set of regions; and selecting the sensitive image data of the first set of regions for encryption in response to detecting the motion and the motion matching to the one type of sensitive image data that is trained in the machine learning model.

4. The computer-implemented method of claim 3, wherein encrypting the sensitive image data further comprises:

encrypting parts of the image where the motion is detected; and retaining an encryption of the parts of the image.

5. The computer-implemented method of claim 1, wherein detecting the first set of regions that contain the sensitive image data further comprises:

detecting a set of facial features in the image data of the first set of regions using the machine learning model; and selecting the set of facial features in the image data of the first set of regions for encryption in response to detecting the set of facial features.

6. The computer-implemented method of claim 5, wherein encrypting the sensitive image data further comprises:

encrypting pixels representing the set of facial features in the image; and retaining an encryption of the pixels.

7. The computer-implemented method of claim 1, wherein detecting the first set of regions that contain the sensitive image data further comprises:

determining a background of the image in the second set of regions;

inverting a selection of the background; and selecting the sensitive image data of the first set of regions for encryption in response to inverting the selection of the background.

8. The computer-implemented method of claim 1, further comprising:

compressing the encrypted image data of the first set of regions with the unencrypted image data in the second set of regions.

9. The computer-implemented method of claim 1, further comprising:

encoding the encrypted image data for the first set of regions and the unencrypted image data for the second set of regions to the selectively encrypted frame.

10. The computer-implemented method of claim 9, further comprising:

generating metadata for the selectively encrypted frame, wherein generating the metadata comprises defining a location of the first set of regions in the selectively encrypted frame and an encryption that is used to encrypt the image data in the first set of regions.

11. The computer-implemented method of claim 9, wherein encoding the encrypted image data comprises:

generating a quantization table; and encrypting the quantization table.

12. The computer-implemented method of claim 1, wherein the selectively encrypted frame is a first frame of the video stream, the computer-implemented method further comprising:

parsing a second image for a second frame of the video stream into a second plurality of regions;

detecting a third set of regions from the second plurality of regions with image data that is a match for one or more of the different types of sensitive image data trained in the machine learning model, wherein the third set of regions includes one or more different regions than the first set of regions;

encrypting the sensitive image data in the third set of regions;

compressing the image data in a fourth set of regions from the second plurality of regions without encryption; and distributing a second selectively encrypted frame of the video stream to the second user device at least one of the one or more user devices.

13. The computer-implemented method of claim 12, wherein detecting the third set of regions comprises:

determining that the sensitive image data in the first set of regions of the first frame has moved to the third set of regions in the second frame.

14. A selective encryption system, comprising:

one or more hardware processors configured to:

train a machine learning model to detect different types of sensitive image data based on visual examples comprising text and visual elements;

join one or more user devices to a secured video conference based on the one or more user devices providing secure access credentials that authorize secure access to the secured video conference;

parse an image that is generated for a video stream of the secured video conference into a plurality of regions, wherein each region of the plurality of regions comprises different image data of the image;

spawn a first thread or process and a second thread or process to execute in parallel;

analyze the plurality of regions in a first copy of the image for the sensitive image data with execution of the first thread or process;

detect, by execution of the first thread or process, a first set of regions from the plurality of regions that contain sensitive image data by comparing the different image data in the plurality of regions to the machine learning model, wherein detecting the first set of regions comprises detecting image data in one or more regions of the first set of regions that matches to one type of sensitive image data trained in the machine learning model;

encrypt the sensitive image data in the first set of regions by:

encrypting the plurality of regions in a second copy of the image with the second thread or process; and selectively decrypting a second set of regions from the plurality of regions in the second copy of the image that were encrypted by the second thread or process and that were determined to not contain the sensitive image data by the first thread or process when detecting the first set of regions; and distribute a selectively encrypted frame to at least one of the one or more user devices, the selectively encrypted frame comprising encrypted image data for the first set of regions and unencrypted image data for the second set of regions.

15. The selective encryption system of claim 14, wherein detecting the first set of regions that contain sensitive image data further comprises:

detecting a change in the image data of the first set of regions between a previous image of the video stream and the image that is a current image of the video stream; and selecting the sensitive image data of the first set of regions for encryption in response to detecting the change in the image data of the first set of regions and a motion associated with the change matching the one type of sensitive image data trained in the machine learning model.

16. The selective encryption system of claim 14, wherein detecting the first set of regions that contain the sensitive image data further comprises:

detecting motion in the first set of regions; and selecting the sensitive image data of the first set of regions for encryption in response to detecting the motion and the motion matching to the one type of sensitive image data that is trained in the machine learning model.

17. The selective encryption system of claim 14, wherein detecting the first set of regions that contain the sensitive image data further comprises:

detecting a set of facial features in the image data of the first set of regions using the machine learning model; and selecting the set of facial features in the image data of the first set of regions for encryption in response to detecting the set of facial features.

18. The computer-implemented method of claim 1, further comprising:

encoding the video stream with a video encoding codec;

analyzing the plurality of regions for the sensitive image data at a first stage of the video encoding codec;

wherein encrypting the sensitive image data further comprises:

interrupting execution of a second stage of the video encoding codec in response to detecting the first set of regions from the plurality of regions that contain the sensitive image data; and performing the encrypting of the sensitive image data in the first set of region regions while execution of the second stage of the video encoding codec is interrupted; and resuming execution of the second stage of the video encoding codec after encrypting the sensitive image data; and performing a compression of the second set of regions according to the second stage of the video encoding codec.

19. A computer-implemented method for selective encryption of image data, the computer-implemented method comprising:

training a machine learning model to detect different types of sensitive image data based on visual examples comprising text and visual elements;

joining one or more user devices to a secured video conference based on the first one or more user devices providing secure access credentials that authorize secure access to the secured video conference;

parsing an image that is generated for a video stream of the secured video conference into a plurality of regions, wherein each region of the plurality of regions comprises different image data of the image;

encoding the video stream with a video encoding codec;

analyzing the plurality of regions for the sensitive image data at a first stage of the video encoding codec, wherein analyzing the plurality of regions comprises:

comparing the different image data in the plurality of regions to the machine learning model; and detecting a first set of regions from the plurality of regions that contain sensitive image data based on the image data in one or more regions of the first set of regions matching to one type of sensitive image data trained in the machine learning model;

encrypting the sensitive image data in the first set of regions, wherein encrypting the sensitive image data comprises:

interrupting execution of a second stage of the video encoding codec in response to detecting the first set of regions that contain the sensitive image data; and obfuscating the image data in the one or more regions of the first set of regions while execution of the second stage of the video encoding codec is interrupted;

compressing the image data in a second set of regions from the plurality of regions without encryption, wherein compressing the image data comprises:

resuming execution of the second stage of the video encoding codec after encrypting the sensitive image data; and performing a compression of the second set of regions according to the second stage of the video encoding codec; and distributing a selectively encrypted frame to at least the second user device one of the one or more user devices, the selectively encrypted frame comprising encrypted image data for the first set of regions and compressed image data for the second set of regions.

20. A selective encryption system, comprising:

one or more hardware processors configured to:

train a machine learning model to detect different types of sensitive image data based on visual examples comprising text and visual elements;

join one or more user devices to a secured video conference based on the first one or more user devices providing secure access credentials that authorize secure access to the secured video conference;

parse an image that is generated for a video stream of the secured video conference into a plurality of regions, wherein each region of the plurality of regions comprises different image data of the image;

encode the video stream with a video encoding codec;

analyze the plurality of regions for the sensitive image data at a first stage of the video encoding codec, wherein analyzing the plurality of regions comprises:

comparing the different image data in the plurality of regions to the machine learning model; and detecting a first set of regions from the plurality of regions that contain sensitive image data based on the image data in one or more regions of the first set of regions matching to one type of sensitive image data trained in the machine learning model;

encrypt the sensitive image data in the first set of regions, wherein encrypting the sensitive image data comprises:

interrupting execution of a second stage of the video encoding codec in response to detecting the first set of regions that contain the sensitive image data; and obfuscating the image data in the one or more regions of the first set of regions while execution of the second stage of the video encoding codec is interrupted;

compress the image data in a second set of regions from the plurality of regions without encryption, wherein compressing the image data comprises:

resuming execution of the second stage of the video encoding codec after encrypting the sensitive image data; and performing a compression of the second set of regions according to the second stage of the video encoding codec; and distribute a selectively encrypted frame to at least the second user device one of the one or more user devices, the selectively encrypted frame comprising encrypted image data for the first set of regions and compressed image data for the second set of regions.

* * * * *